United States Patent
Siebers et al.

(10) Patent No.: US 6,673,729 B2
(45) Date of Patent: Jan. 6, 2004

(54) GLASS CERAMIC

(75) Inventors: Friedrich Siebers, Nierstein (DE); Hans-Werner Beudt, Wiesbaden (DE); Dirk Sprenger, Stadecken-Elsheim (DE)

(73) Assignee: Schott Glas, Mainz (DE)

( * ) Notice: Subject to any disclaimer, the term of this patent is extended or adjusted under 35 U.S.C. 154(b) by 46 days.

(21) Appl. No.: 10/068,804

(22) Filed: Feb. 5, 2002

(65) Prior Publication Data
US 2002/0183187 A1 Dec. 5, 2002

(30) Foreign Application Priority Data
Mar. 2, 2001 (DE) .......................... 101 10 225

(51) Int. Cl.⁷ .............................. C03C 10/14; G02B 5/08
(52) U.S. Cl. .............................. 501/4; 501/7; 428/426; 428/428; 428/432; 359/359
(58) Field of Search .................... 501/4, 7; 428/426, 428/428, 432; 359/359

(56) References Cited

U.S. PATENT DOCUMENTS

| | | | |
|---|---|---|---|
| 4,192,688 A | * 3/1980 | Babcock et al. | 501/4 |
| 4,285,728 A | 8/1981 | Babcock et al. | |
| 4,755,488 A | 7/1988 | Nagashima | |
| 4,940,674 A | * 7/1990 | Beall et al. | 501/4 |
| 5,446,008 A | * 8/1995 | Krolla et al. | 501/68 |
| 5,591,682 A | * 1/1997 | Goto | 501/4 |
| 5,922,271 A | * 7/1999 | Semar et al. | 264/602 |
| 6,043,171 A | * 3/2000 | Siebers et al. | 501/66 |
| 6,358,869 B1 | * 3/2002 | Yamada et al. | 501/4 |

FOREIGN PATENT DOCUMENTS

| | | |
|---|---|---|
| DE | 43 21 373 | 1/1995 |
| DE | 199 07 038 | 8/2000 |
| DE | 199 39 787 A1 | 2/2001 |
| EP | 0 428 002 A1 | 5/1991 |
| EP | 581 610 | 2/1994 |
| EP | 1 074 518 A1 | 2/2001 |
| GB | 1375097 | 11/1974 |
| GB | 2 220 906 | 8/1988 |
| JP | H7-37334 | 4/1995 |

* cited by examiner

Primary Examiner—Karl Group
(74) Attorney, Agent, or Firm—Fulbright & Jaworski, L.L.P.

(57) ABSTRACT

The invention relates to a glass and a glass-ceramic comprising beta-quartz and/or keatite solid solutions, and to a process for their production, and to their use as substrate material for coating. Glass-ceramic comprising beta-quartz and/or keatite solid solutions with a surface roughness without polishing of Ra<50 nm, a thermal expansion in the temperature range between 20° C. and 300° C. of <1.2•10⁻⁶/K, a transmission in the near infrared region at 1050 nm of >85% for a 4 mm thickness, and a composition in % by weight, based on the total composition, containing:

| | |
|---|---|
| $Li_2O$ | 3.0–5.5 |
| $Na_2O$ | 0–2.5 |
| $K_2O$ | 0–2.0 |
| $\Sigma\, Na_2O + K_2O$ | 0.5–3.0 |
| $\Sigma\, MgO + ZnO$ | <0.3 |
| SrO | 0–2.0 |
| BaO | 0–3.5 |
| $B_2O_3$ | 0–4.0 |
| $Al_2O_3$ | 19.0–27.0 |
| $SiO_2$ | 55.0–66.0 |
| $TiO_2$ | 1.0–5.5 |
| $ZrO_2$ | 0–2.5 |
| $\Sigma\, TiO_2 + ZrO_2$ | 3.0–6.0 |
| $P_2O_5$ | 0–8.0 |
| $Fe_2O_3$ | <200 ppm |
| F | 0–0.6 as substitute for O | and, if appropriate, at least one refining agent, such as $As_2O_3$, $Sb_2O_3$, $SnO_2$, $CeO_2$, sulphate and chloride compounds.

20 Claims, 2 Drawing Sheets

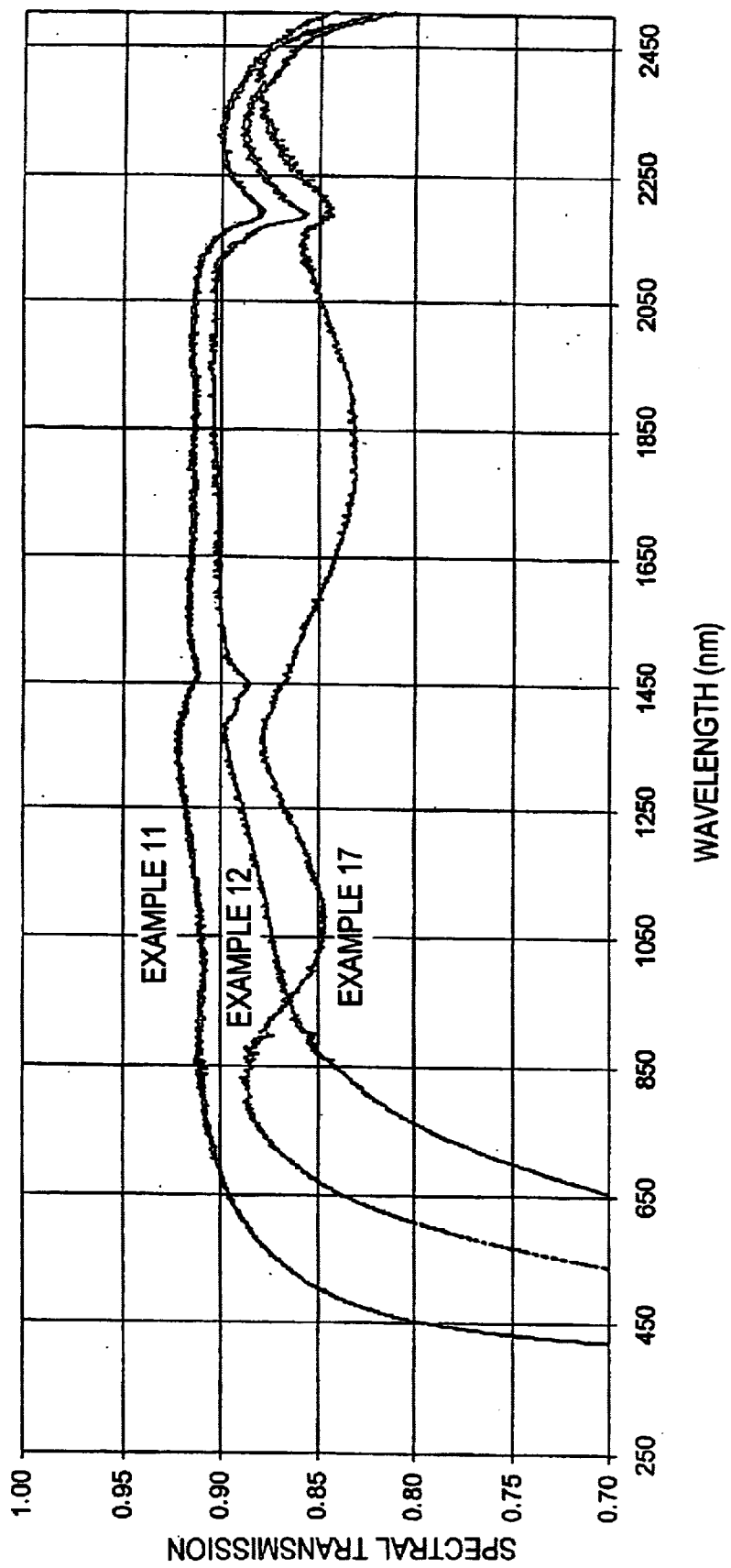

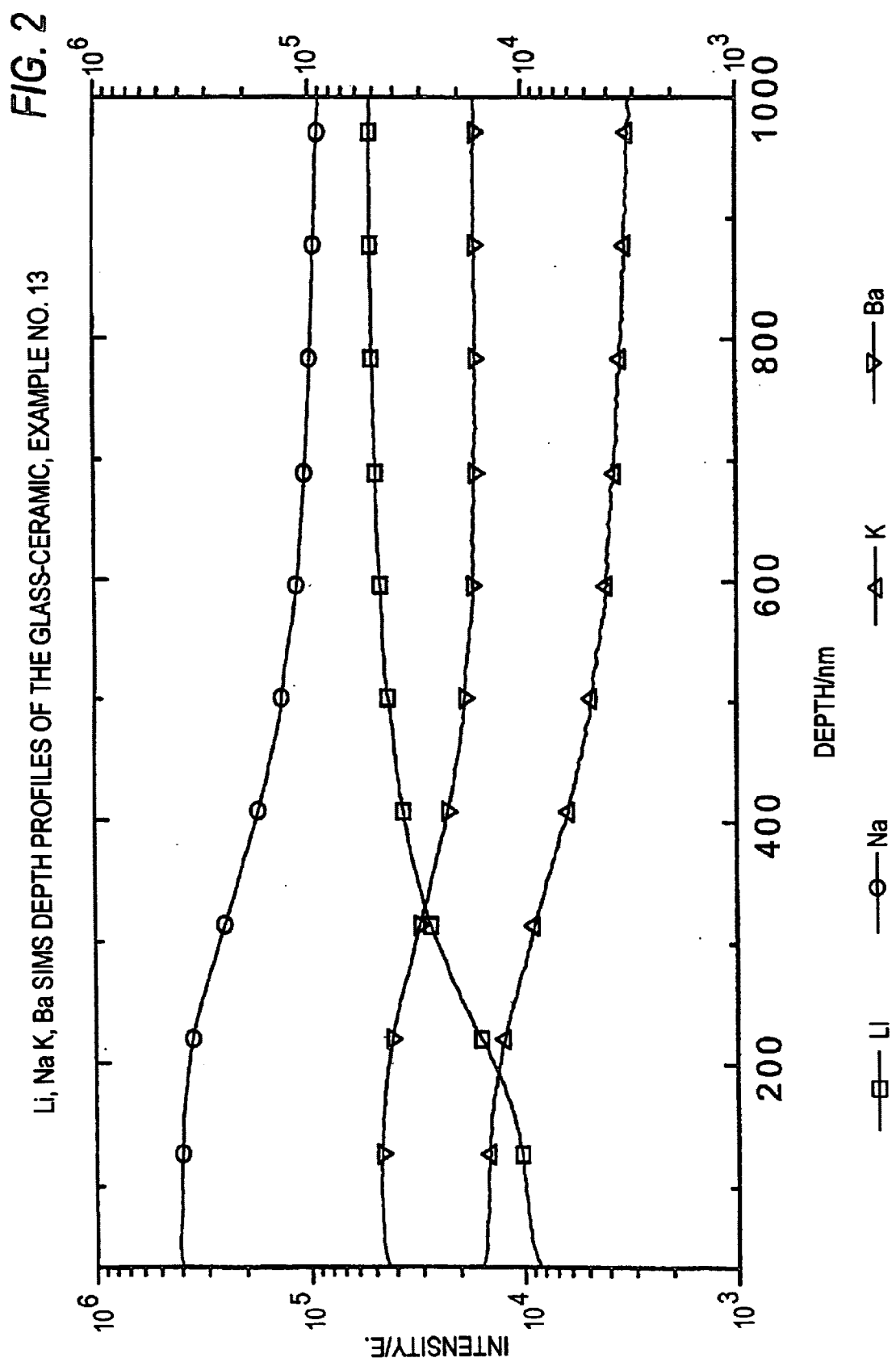

GLASS CERAMIC

The invention relates to a glass and a glass-ceramic comprising beta-quartz and/or keatite solid solutions, and to a process for producing them, and to their use as a substrate material for coating.

It is known that glasses from the system $Li_2O$—$Al_2O_3$—$SiO_2$ can be converted into glass-ceramics comprising beta-quartz solid solutions and/or keatite solid solutions as the main crystal phases. These glass-ceramics are produced in a plurality of stages. After melting and hot-shaping, the material is usually cooled at temperatures in the region of the transformation temperature (Tg), in order to eliminate thermal stress. The material is cooled further to room temperature. The specified quality features of the glass body are investigated.

A second controlled heat treatment is used to crystallize the starting glass and convert it into a glass-ceramic article. This ceramicization takes place in a multistage thermal process in which first of all, by nucleation at temperatures of 600° C. to 800° C., nuclei are produced from $TiO_2$ or $ZrO_2/TiO_2$ solid solutions. $SnO_2$ may also be involved in the nucleation. During the subsequent temperature rise, beta-quartz solid solutions grow on these nuclei at the crystallization temperature of 700° C. to 900° C. As the temperature rises further, in the range from 800° C. to 1100° C., these beta-quartz solid solutions are further transformed into keatite solid solutions. Depending on the composition, the stability range of the glass-ceramic containing beta-quartz solid solution is extensive. With some compositions, the temperature of transition to the keatite solid-solution phase lies up to 150° C. higher than the crystallization temperature of the beta-quartz solid solution glass-ceramic. With other compositions, the beta-quartz solid solutions are converted into keatite solid solutions almost without any transition. The transition to keatite solid solution is associated with crystal growth, therefore with increasing crystallite size. This leads to increasing light scattering. The light transmission is reduced to an increasing extent. As a result, the glass-ceramic article appears increasingly translucent and ultimately opaque. The high light transmission of the glasses and glass-ceramics allows effective assessment of quality. Shaped bodies with defects which are relevant to safety or jeopardize the specified product properties can be sorted out prior to further process steps.

A key property of these glass-ceramics is that it is possible to produce materials which have an extremely low coefficient of thermal expansion in the range from 20° C. to 300° C. and above of $<1.5 \cdot 10^{-6}/K$. With glass-ceramics which contain beta-quartz solid solutions as the main crystal phase, even materials with virtually no expansion are obtained in this temperature range. For use as substrate material for reflectors used in astronomy, glass-ceramics are modified in such a way that their zero thermal expansion lies in the temperature range of −50° C. to +50° C. which is important for this application. A glass-ceramic material of this type is produced under the name ZERODUR at SCHOTT GLAS.

A recent development is for these glass-ceramics also to be used in illumination engineering as a material for reflectors in applications in which, on account of miniaturisation and high luminous powers, too high thermal loads occur. Compared to the widespread reflectors made from borosilicate or aluminosilicate glass, these glass-ceramics satisfy extremely high demands with regard to the ability to withstand thermal loads and temperature gradients. In the reflectors, light sources which allow a high luminous intensity to be produced within a small volume are used. The light sources are based on the technical principle of high-power halogen lamps, arc lamps or gas discharge lamps. The radiation maximum from these ultrahigh power lamps lies at wavelengths of 1 $\mu m$, i.e. in the near infrared.

These glass-ceramics may be coated with metallic layers, such as aluminium, or with alternating layer systems of oxide substances. The multiple oxide layers use the interference principle and enable the visible light to be reflected while the incident infrared radiation is transmitted to the rear. The intention is for the substrate material to have a high IR transmission, so that it transmits the IR radiation to the rear without being heated to an unacceptable extent. Reflectors of this type are known as cold-light reflectors. Digital projection equipment and DVD or video recorder projection equipment are increasingly being equipped with glass-ceramic cold-light reflectors.

Glass-ceramics which are used as substrates for mirrors used in astronomy are described in DE-A-1902432 and U.S. Pat. No. 4,285,728. The shaping is produced by casting the molten glass into a refractory die. Prior to the mirror-coating, the glass-ceramics comprising beta-quartz solid solution as the predominant crystal phase which are obtained after the crystallization are initially ground and then polished. This process leads to the desired geometric contour and a low surface roughness. However, it is time-consuming and expensive.

JP-B-95037324 describes glass-ceramics made from beta-quartz or keatite solid solutions for use as reflective mirror substrate materials which, after the ceramicization, have a low surface roughness Ra of at most 0.03 $\mu m$ even without polishing and have a composition in % by weight which comprises 50–65 $SiO_2$, 18–30 $Al_2O_3$, 3–8 $Li_2O$, 3–5 $TiO_2+ZrO_2$, 0.3–7 RO(R=Mg, Ca, Zn, Pb or V) and up to 3 $R_2O$ (R=K, Na).

U.S. Pat. No. 4,438,210 describes transparent glass-ceramics comprising beta-quartz solid solution as the predominant crystal phase, which glass-ceramics, despite having relatively high contents of $Fe_2O_3$ of up to 1000 ppm, are substantially colourless. The composition of the glass-ceramics, in % by weight, comprises 65–75 $SiO_2$, 1–4 $Li_2O$, 15–25 $Al_2O_3$, 0.5–2 ZnO, 0–2 $Na_2O$ and/or $K_2O$, 2–6 $TiO_2$, 0–2 $ZrO_2$, 0–2.5 BaO, 0–1.2 F and 100–1000 ppm of $Fe_2O_3$.

It is an object of the invention to provide a glass and a glass-ceramic comprising beta-quartz and/or keatite solid solutions which are suitable for coating with a mirror coating, and to provide an economic and environmentally friendly process for producing the glass and glass-ceramic.

The object is achieved by a glass-ceramic having a composition in % by weight, based on the total composition, of:

| | |
|---|---|
| $Li_2O$ | 3.0–5.5 |
| $Na_2O$ | 0–2.5 |
| $K_2O$ | 0–2.0 |
| $\Sigma\ Na_2O + K_2O$ | 0.5–3.0 |
| $\Sigma\ MgO + ZnO$ | <0.3 |
| SrO | 0–2.0 |
| BaO | 0–3.5 |
| $B_2O_3$ | 0–4.0 |
| $Al_2O_3$ | 19.0–27.0 |
| $SiO_2$ | 55.0–66.0 |
| $TiO_2$ | 1.0–5.5 |
| $ZrO_2$ | 0–2.5 |
| $\Sigma\ TiO_2 + ZrO_2$ | 3.0–6.0 |
| $P_2O_5$ | 0–8.0 |
| $Fe_2O_3$ | <200 ppm |
| F | 0–0.6 |
| | as substitute for O | and, if appropriate, at least one refining agent, such as $As_2O_3$, $Sb_2O_3$, $SnO_2$, $CeO_2$, sulphate and chloride compounds.

The glass-ceramic according to the invention has a low viscosity, which is advantageous for shaping by pressing, with a working point $V_A$ of <1300° C.

a good devitrification stability with an upper devitrification temperature which lies at most 50° C. above the working point $V_A$ a surface roughness of the glass and glass-ceramic without polishing of Ra<50 nm, preferably <20 nm a thermal expansion of the glass-ceramic in the temperature range between room temperature and 300° C. of <1.2•10$^{-6}$/K a high transmission on the part of the glass and the glass-ceramic in the near infrared region at 1050 nm of >85% for a thickness of 4 mm.

For shaping by pressing or blowing, the glass is to have a low working point $V_A$ of <1300° C. As a result, the thermal loads in the region of the feeder, the outlet and for the press tools are reduced, so that the service lives are increased. The low viscosity also has a beneficial effect on the melting of the glass in the melting end and on the blowing quality of the glass obtained.

To avoid undesired devitrification of the molten glass during shaping and production of the drop in the feeder, the upper devitrification point of the molten glass should lie at most 50° C. above the working point ($V_A$). The upper devitrification point of the molten glass is the highest temperature at which the first crystals come into contact with the shaping materials. With this temperature interval, experience has shown that it is still possible to avoid critical formation of crystals at the orifice ring or in the feeder, since the glass temperature during the conditioning of the drop is significantly above $V_A$. It is more advantageous if the upper devitrification temperature lies below $V_A$.

The low surface roughness of the vitreous shaped body obtained during pressing must not deteriorate to an unacceptable extent during the crystallization. Particularly when forming large mean crystallite sizes, the surface roughness of the glass-ceramic may rise. After the application of the mirror coating, the surface roughness is substantially maintained and effects partial scattering of the light. This light scattering has an adverse effect on the light efficiency. The aim for the surface roughness is for the Ra value of the glass-ceramic to be <50 nm, preferably <20 nm. This leads to light efficiencies which generally eliminate the need for expensive polishing of the substrate material prior to the coating.

For applications in which extremely high demands are imposed on the ability of the mirror substrate material to withstand thermal loads, the thermal expansion of the glass-ceramic in the temperature range between room temperature and 300° C. should be less than 1.2•10$^{-6}$/K. This results in a high ability to withstand temperature gradients, since the temperature differences in the mirror substrate material are unable to bring about critical, thermally-induced stresses. In particular, the defects in the glass-ceramic or microcracks between mirror coating and substrate material, which cannot be avoided altogether, cannot be made to grow when the appliance is being switched on or off or in use on account of stresses caused by temperature differences.

Particularly for use as a cold-light reflector, in applications involving extremely high radiant power, the material must have a high transmission in the near infrared region, so that it transmits the IR radiation to the rear without being heated to an unacceptable extent. The composition according to the invention results in an IR transmission of >85% at 1050 nm and a thickness of 4 mm. The radiation maximum of the most intensive light sources lies at this wavelength. Unfortunately, in glasses and glass-ceramics of the $Li_2O$—$Al_2O_3$—$SiO_2$ type, there is also an absorption band at this wavelength, which is attributed to the divalent iron $Fe^{2+}$. To reduce the absorption in this critical range, therefore, very clean mix raw materials, i.e. with low levels of iron, need to be selected. The preparation of the cutlet and the entire process must also keep contamination caused by iron at a low level. In both cases, this leads to increased outlay and therefore it is economically disadvantageous. Oxidic melt management by the use of nitrates as raw materials for the mix is only to a small extent able to oxidize the harmful $Fe^{2+}$ to form $Fe^{3+}$. The composition according to the invention leads to a good IR transmission of >85% at 1050 nm, with economically acceptable $Fe_2O_3$ contents of up to 200 ppm.

The composition according to the invention of the glass-ceramic comprising beta-quartz and/or keatite solid solutions contains, in % by weight, based on the total composition:

| | |
|---|---|
| $Li_2O$ | 3.0–5.5 |
| $Na_2O$ | 0–2.5 |
| $K_2O$ | 0–2.0 |
| $\Sigma\ Na_2O + K_2O$ | 0.5–3.0 |
| $MgO + ZnO$ | <0.3 |
| SrO | 0–2.0 |
| BaO | 0–3.5 |
| $B_2O_3$ | 0–4.0 |
| $Al_2O_3$ | 19.0–27.0 |
| $SiO_2$ | 55.0–66.0 |
| $TiO_2$ | 1.0–5.5 |
| $ZrO_2$ | 0–2.5 |
| $\Sigma\ TiO_2 + ZrO_2$ | 3.0–6.0 |
| $P_2O_5$ | 0–8.0 |
| $Fe_2O_3$ | <200 ppm |
| F | 0–0.6 as substitute for O | and, if appropriate, at least one refining agent, such as $As_2O_3$, $Sb_2O_3$, $SnO_2$, $CeO_2$, sulphate and chloride compounds.

The oxides $Li_2O$, $Al_2O_3$ and $SiO_2$ are necessary constituents of glass-ceramics comprising beta-quartz and/or keatite solid-solution phases. MgO, ZnO and $P_2O_5$ may be incorporated in the crystal phases as further components. $Li_2O$ contents of over 5.5% by weight increase the rate of crystal growth and put the devitrification stability at risk. The MgO content is limited on account of the increased discoloration in combination with $Fe_2O_3$ trace concentrations. Zn, which is related to Mg in crystal chemistry terms, is also limited for this reason. The sum of the MgO and ZnO should be less than 0.3% by weight. The $P_2O_5$ content is limited to at most 8% by weight. Higher levels lead to a significantly reduced chemical stability of the glass-ceramic. This is disadvantageous since the glass-ceramic substrate materials are usually chemically cleaned before being coated with the mirror coating, in order to remove surface contamination, in particular of an organic nature. If the chemical stability of the glass-ceramic is poor, the surface of the glass-ceramic may be attacked, with the result that the surface roughness deteriorates and the light efficiency is reduced. The $Al_2O_3$ content should be 19–27% by weight.

The $Al_2O_3$ content is less than 27% by weight in order to avoid high viscosities of the molten glass and the undesired devitrification of the molten glass to form mullite. The $SiO_2$ content is limited to at most 66% by weight, since this component increases the viscosity of the glass and impairs the relatively low working points $V_A$ of the molten glass, which are more advantageous for shaping by pressing. The addition of the alkali metal oxides $Na_2O$,$K_2O$ and of the alkaline-earth metal oxides SrO, BaO improves the melting properties and the devitrification properties of the glass during production. To achieve the desired low working points $V_A < 1300°$ C., the sum of $Na_2O+K_2O$ should be at least 0.5% by weight. The use of $Na_2O$ and $K_2O$ is necessary in order to produce a vitreous surface layer, which is advantageous for the low surface roughness, in the glass-ceramic. Higher levels of $Na_2O$, $K_2O$, SrO, BaO and $B_2O_3$ than the limits indicated cause unacceptable deterioration of the thermal expansion. This can be explained by the fact that these components remain substantially in the residual glass phase of the glass-ceramic. As residual glass-forming agents, higher levels may also impair the crystallization behaviour. $TiO_2$ and $ZrO_2$ are important as nucleating agents. The sum of the nucleating agents $TiO_2+ZrO_2$ should be 3.0 to 6.0% by weight. Minimum levels of 3.0% by weight are necessary in order to achieve the high nucleus density which is required for high light transmission and infrared transmission and therefore small crystallite sizes. The small crystallite sizes are also required in order to achieve a low surface roughness of the glass-ceramic without polishing of Ra<50 nm, preferably <20 nm. The amount of nucleating agents should not exceed 6.0% by weight, since otherwise the devitrification stability of the molten glass during shaping by pressing deteriorates. The composition may contain up to 0.6% by weight of F as substitute for O. The addition of fluorine has proven appropriate in order to reduce the viscosity of the molten glass and may also increase the strength of the glass-ceramic, but even contents of 0.6% by weight lead to a deterioration in the temperature/time load-bearing capacity (compaction). It may also lead to spalling as a result of changes at the surface of the glass-ceramic.

The glass melts are refined using the refining agents which are customary for this glass system, such as $As_2O_3$, $Sb_2O_3$, $SnO_2$, $CeO_2$, sulphate and chloride compounds in the customary quantities of 0.5 to 2% by weight.

Depending on the raw materials selected for the mix and on the process conditions during the melting, the water content of the glasses according to the invention is usually between 0.01 and 0.06 mol/l.

In a preferred embodiment, the glass is converted into a glass-ceramic comprising beta-quartz solid solutions as the main crystal phase. The glass-ceramic contains the following composition in % by weight, based on the total composition:

| | |
|---|---|
| $Li_2O$ | 3.0–5.0 |
| $Na_2O$ | 0–2.0 |
| $K_2O$ | 0–1.5 |
| $\Sigma Na_2O + K_2O$ | 0.5–2.5 |
| MgO + ZnO | <0.30 |
| SrO | 0–2.0 |
| BaO | 0–3.5 |
| $\Sigma$ SrO + BaO | <4.0 |
| $B_2O_3$ | 0–4.0 |
| $Al_2O_3$ | 19.0–27.0 |
| $SiO_2$ | 55.0–66.0 |
| $TiO_2$ | 1.0–5.5 |
| $ZrO_2$ | 0–2.5 |
| $\Sigma TiO_2 + ZrO_2$ | 3.5–5.5 |
| $P_2O_5$ | 0–8.0 |
| $\Sigma B_2O_3 + P_2O_5$ | 1.0–8.0 |
| $Fe_2O_3$ | <130 ppm |
| F | 0–0.3 as substitute for O | and, if appropriate, at least one refining agent, such as $As_2O_3$, $Sb_2O_3$, $SnO_2$, $CeO_2$, sulphate and chloride compounds.

The glass-ceramic is distinguished by a particularly low thermal expansion of $<0.5 \cdot 10^{-6}/K$ in the temperature range from 20° C. to 300° C. and a very high transmission in the near infrared region, for a thickness of 4 mm, at 1050 nm of >87%, preferably >89%. The $Fe_2O_3$ content should be reduced to below 130 ppm by selecting low-iron raw materials for the mix. The contents of alkaline metals, alkaline-earth meals, fluorine and the sum of the nucleating agents $TiO_2+ZrO_2$ are limited. The composition should contain in total $B_2O_3+P_2O_5$ 1–8% by weight. These conditions lead to crystallization to form a glass-ceramic which contains beta-quartz solid solutions with small crystallite sizes and the desired properties.

To achieve a preferred object of the invention of providing a glass-ceramic which, through selection of the production conditions, contains almost exclusively beta-quartz solid solutions as crystal phase or contains almost exclusively keatite solid solutions, the crystallization temperature of the beta-quartz solid-solution phase and the temperature of transition to the keatite solid solutions should be at least 40° C., preferably more than 80° C. apart. This object is achieved by reduction, in particular in the case of the residual glass-forming agents, the alkali metals, the alkaline-earth metals, $B_2O_3$. The composition should also be free of added fluorine. According to this preferred embodiment, the glass-ceramic contains a composition, in % by weight, based on the total composition:

| | |
|---|---|
| $Li_2O$ | 3.0–5.0 |
| $Na_2O$ | 0–2.0 |
| $K_2O$ | 0–1.5 |
| $\Sigma Na_2O + K_2O$ | 0.5–2.0 |
| MgO + ZnO | <0.30 |
| SrO | 0–2.0 |
| BaO | 0–3.5 |
| $\Sigma$ SrO + BaO | <3.0 |
| $B_2O_3$ | 0–3.0 |
| $Al_2O_3$ | 21.0–27.0 |
| $SiO_2$ | 55.0–66.0 |
| $TiO_2$ | 1.5–5.5 |
| $ZrO_2$ | 0–2.5 |
| $\Sigma TiO_2 + ZrO_2$ | 3.5–5.0 |
| $P_2O_5$ | 0–8.0 |
| $\Sigma B_2O_3 + P_2O_5$ | 1.0–8.0 |
| $Fe_2O_3$ | <200 ppm | technically free of F and, if appropriate, at least one refining agent, such as $As_2O_3$, $Sb_2O_3$, $SnO_2$, $CeO_2$, sulphate and chloride compounds.

A glass-ceramic which is particularly advantageous for shaping by pressing has a low working point $V_A$ of <1270° C. and an upper devitrification temperature which is close to or even lower than the working point $V_A$. Crystal phases which are critical with regard to devitrification are primarily mullite (aluminium silicate), baddeleyite ($ZrO_2$). For an improved devitrification performance of this nature, it is necessary for the constituents of this critical crystal phase, in particular $Al_2O_3$, $SiO_2$, $ZrO_2$, to be limited, while an increase in the levels of the alkali metals $Na_2O$, $K_2O$, and of the alkaline-earth metals SrO, BaO has a positive effect on the devitrification behaviour. The $P_2O_5$ content should be at least 1% by weight, since $P_2O_5$ counteracts the devitrification of mullite. The composition is free of added fluorine. The preferred glass-ceramic having these properties contains a composition, in % by weight, based on the total composition, of:

| | |
|---|---|
| Li$_2$O | 3.0–5.0 |
| Na$_2$O | 0–2.0 |
| K$_2$O | 0–1.5 |
| Σ Na$_2$O + K$_2$O | 0.5–2.5 |
| MgO + ZnO | <0.30 |
| SrO | 0–2.0 |
| BaO | 0–3.5 |
| Σ SrO + BaO | 1.0–4.0 |
| B$_2$O$_3$ | 0–4.0 |
| Al$_2$O$_3$ | 20–25 |
| SiO$_2$ | 55–63 |
| TiO$_2$ | 1.5–5.5 |
| ZrO$_2$ | 0–2.0 |
| Σ TiO$_2$ + ZrO$_2$ | 3.5–5.0 |
| P$_2$O$_5$ | 1.0–8.0 |
| Σ B$_2$O$_3$ + P$_2$O$_5$ | 2.0–8.0 |
| Fe$_2$O$_3$ | <200 ppm | technically free of F and, if appropriate, at least one refining agent, such as As$_2$O$_3$, Sb$_2$O$_3$, SnO$_2$, CeO$_2$, sulphate and chloride compounds.

To achieve the required low surface roughness after the conversion of the glass into a glass-ceramic, without polishing, of Ra<50 nm, preferably <20 nm, the mean crystallite size of the glass-ceramic should be <300 nm, preferably <80 nm. In this case, with a glass-ceramic which contains beta-quartz solid solution, it is generally possible to achieve smaller crystallite sizes, since the transition to keatite solid solutions makes the microstructure become more coarse. If the crystallites are directly at the surface of the substrate material, they are of decisive importance for the surface roughness.

The result of the composition according to the invention comprising the alkali metal oxides Na$_2$O, K$_2$O is that a vitreous surface layer which is enriched with these components is formed during the ceramicization, with a thickness of up to 1.5 μm. Additions of the alkaline-earth metal oxides SrO, BaO and B$_2$O$_3$ also assist the formation of the vitreous surface layer. Greater thicknesses should be avoided, on account of the risk of surface cracks caused by differences in the thermal expansion. The vitreous surface layer has the effect of making the increase in surface roughness in the glass-ceramic compared to the starting glass less than 10 nm, generally less than 5 nm. The surface roughness of the substrate material is then determined primarily by the surface roughness produced by the process conditions employed during pressing.

In some applications, it is desirable to dye the glass-ceramic in the visible region. The advantages of high transmission in the near infrared region from 900 to 1800 nm for use as a cold-light reflector should be maintained. The good light transmission in order to achieve reliable quality assessment of the pressed vitreous shaped body should also be maintained. The coloured oxide V$_2$O$_5$ in amounts of from 0.1 to 0.5% by weight has proven particularly suitable for the combination of good light transmission in the vitreous state, colouring of the glass-ceramic in the visible region and high transmission of the glass-ceramic in the near infrared region. The addition of V$_2$O$_5$ leads to a slightly green colour in the glass, and strong colouring occurs during the ceramicization, while there is only little absorption in the near infrared.

The maximum ability of the glass-ceramic to withstand the thermal loads is determined by the compaction. Compaction means that the regions of the glass-ceramic substrate material which are exposed to high thermal loads contract to a greater extent than regions which are exposed to lower thermal loads. This effect occurs as a result of changes in the microstructure as a function of the temperature/time load on the glass-ceramic. The different temperature/time load and associated compaction makes its presence felt in particular in the case of relatively large items. A high compaction leads to unacceptably high compaction stresses between the regions of the article which are exposed to high thermal loads and those which are subject to lower thermal loads. In extreme circumstances, this may lead to fracturing after prolonged use at elevated temperatures. The compaction, based on a specimen length of 100 mm, should be less than 60 μm after conditioning at 600° C., 200 h, since this would satisfy even applications involving extremely high thermal loads.

For use as a cold-light reflector, it is advantageous if the IR transmission is >85%, preferably >87%, for a thickness of 4 mm, not only at the wavelength or 0.50 nm but also over the entire range from 900 to 1800 nm. This broad wavelength range corresponds to the radiation maxima for most light-intensive types of lamp and their spectral distribution. This makes the glass-ceramic substrate material versatile in use.

For applications in which the demands imposed on the ability to withstand temperature gradients and thermal loads are not so extreme, it is economically advantageous to leave the substrate material in the vitreous form, in order to eliminate the process step of ceramicization. To satisfy requirements, the glass should have a thermal expansion in the temperature range between room temperature and 300° C. of <5•10$^{-6}$/K, preferably <4.5•10$^{-6}$/K, and a transformation temperature Tg of greater than 600° C. The IR transmission should reach the high levels of >85%, preferably >87%, for a thickness of 4 mm, in the wavelength range from 900 nm to 1800 nm which are known from the glass-ceramic.

To allow reliable quality inspection of the pressed shaped bodies, the light transmission of the glass should be at least 85%, for a thickness of 4 mm. This high light transmission enables shaped bodies with defects which are relevant to safety or which may impair the specified product properties, such as the good light efficiency, to be sorted out. This is economically advantageous, since the following process steps up to and including the coated substrate material and final inspection cause additional costs. The light transmission of the glass-ceramic should be at least 50%, preferably more than 85%, measured at a thickness of 4 mm, in order to be able to identify flaws which occur during ceramicization and to enable the article to be sorted out prior to further process steps. For the high light transmission, it is necessary to reduce absorption and scattering effects. The absorption is substantially reduced by the low iron contents in combination with reduced TiO$_2$, MgO and ZnO contents. To reduce the light scattering, it is necessary to reduce the crystallite sizes to significantly below the wavelength of the visible light and to keep the differences in the refractive index between crystal phase and residual glass phase at a low level.

In a preferred embodiment, the vitreous or glass-ceramic substrate material is in the form of a reflector, the inner contour of which approaches one or more parabolas. If the light source is arranged substantially as a spot source in the focal point of the parabola, the inner contour will be designed as a parabola, in order to achieve a parallel orientation of the reflected light. In the case of a light source which, for design reasons, has a linear extent, it is technically often advantageous for the inner contour to approach one or more parabolas.

To produce the cold-light reflector, the vitreous or glass-ceramic substrate material is coated with an IR-transmitting mirror coating. Metals, such as aluminium, are relatively unsuitable for this purpose, since they reflect in the near IR region. Layer sequences of various oxide layers which are optimized in terms of the number, sequence and thicknesses of the layers and the refractive indices of the layers enable these layer sequences to achieve good reflection in visible light but to be transmissive in the infrared for the thermal radiation of the light source. It is preferable to use layer sequences of oxides, such as $SiO_2$ and $TiO_2$. Vacuum vapour deposition, sputtering and preferably PICVD coating can be used as coating processes.

In the process according to the invention for the production of a vitreous substrate material, which can be converted into a glass-ceramic comprising beta-quartz and/or keatite solid solutions, for coating with a mirror coating, the shaping takes place via a feeder, in which a drop of defined weight is added to a pressing die. A ram with a smoothed surface is used to impress the required parabolic contour of the substrate material. The vitreous substrate materials are then removed from the pressing die and undergo thermal stress relief in a cooling furnace. The quality inspection for sorting out defective shaped bodies then takes place.

The glass according to the invention allows use both as a vitreous substrate material for coating and, after conversion into a glass-ceramic comprising beta-quartz solid solutions or keatite solid solutions as the main crystal phase, has a glass-ceramic substrate material with a high ability to withstand temperature gradients and thermal loads.

In the process for converting the pressed vitreous substrate material into the glass-ceramic comprising beta-quartz solid solution as the main crystal phase, the glass is nucleated at temperatures of 630° C. to 750° C. for a duration of >15 minutes, in order to produce high nucleus densities, and then the crystallization is carried out at temperatures of 700° C. to 850° C., for a duration of at least 30 minutes. On account of this process, the mean crystallite size of the glass-ceramic is less than 80 nm, and the thermal expansion in the temperature range between 20° C. and 300° C. is less than $0.5 \cdot 10^{-6}$/K.

To convert the pressed, vitreous substrate material into a glass-ceramic comprising keatite solid solution as the main crystal phase, the conversion takes place at temperatures of 780° C. to 1000° C., and the mean crystallite size is in this case less than 300 nm, and the thermal expansion in the temperature range between 20° C. and 300° C. is less than $1.2 \cdot 10^{-6}$/K. Glass-ceramic substrates materials with keatite solid solutions as the main crystal phase have a higher thermal expansion and therefore a reduced ability to withstand temperature gradients compared to glass-ceramic substrate materials comprising beta-quartz solid solutions as the main crystal phase. On account of the larger mean crystallite sizes, the light transmission is also lower, and a slightly translucent appearance, caused by scattering at the crystallites, can be observed. Glass-ceramic substrate materials comprising keatite solid solutions as the main crystal phase generally have an improved temperature/time load-bearing capacity (compaction). They can therefore be recommended for applications involving elevated use temperatures.

It is economically advantageous if vitreous substrate materials and glass-ceramics comprising beta quartz and keatite as the main crystal phase can be produced from the same composition, since they have different (property profiles and production costs.

The glass-ceramic according to the invention and/or the starting glass is preferably used as a reflector, in particular a cold-light reflector, as a substrate material for a mirror coating, as a supplementary plate in illumination engineering, in particular where, on account of a high luminous power, it is necessary to tolerate a high radiant heat combined with temperature differences. While the vitreous substrate material provides economically favourable solutions where there are reduced demands on the ability to withstand thermal loads and temperature gradients, the glass-ceramics satisfy extremely high demands with respect to these properties. These substrate materials have a very high infrared transmission and can therefore be used as cold-light reflectors.

The invention is explained further with reference to examples and a drawing.

The starting glasses were melted and refined using raw materials which are customary in the glass industry at temperatures of 1620° C. After the melting in crucibles made from sintered fused silica, the melts were poured into platinum crucibles and were homogenized by stirring at temperatures of 1580° C. for 30 min. After standing for 2 h at 1640° C., castings with a size of 140×100×30 mm were cast and were cooled to room temperature in a cooling furnace starting from 650° C., in order to reduce thermally induced stresses. The test specimens, such as bars for measuring the coefficient of thermal expansion and small plates for measuring the transmission, were produced from these castings. The vitreous specimens, in the sizes required for tests carried out on glass-ceramics, were then converted into the glass-ceramic using the nucleation and crystallization conditions listed.

Table 1 shows compositions of glasses according to the invention. Examples 7, 8 and 9 are comparative examples and demonstrate the advantages of the invention over the prior art.

The iron contents resulting from the raw materials used are given in ppm. The $H_2O$ content was determined by infrared measurements and is given in mol/l.

The transformation temperature Tg, the working point $V_A$, the thermal expansion in the temperature range between 20° C. and 300° C., the density, the degree of light transmission τ in the visible light region in accordance with EN 410 and the infrared transmission, for a thickness of 4 mm, at the wavelengths 1050 and 1800 nm were determined on the melted glasses.

To measure the devitrification behaviour, the glasses were melted in the platinum crucible. The platinum crucibles were then held at various temperatures in the region of the working point for 5 h. The highest temperature at which the first crystals in the glass melt came into contact with the platinum crucible determines the upper devitrification temperature (UDL=upper devitrification limit). The critical crystal phase which occurs during devitrification is listed in the table.

DTA measurements show the crystallization temperature of the glass for transition to the glass-ceramic containing beta-quartz solid solution and for the transformation temperature to the glass-ceramic containing keatite solid solution. A uniform, constant heating rate of 5 K/min was used. The temperatures for crystallization of the beta-quartz solid solution glass-ceramic and the transition to the glass-ceramic containing keatite solid solution are listed in the table.

As can be seen from Table 1, glasses No. 1 to 6 according to the invention satisfied the requirements imposed on the glass for shaping by pressing and for use as substrate material for coating with a mirror coating in vitreous form.

The working point $V_A$ was lower than 1300° C., in some cases even below 1270° C. The upper devitrification temperature UDL was at most 50° C. above the working point $V_A$ of the glasses, in some cases even below it.

The thermal expansion of the glass in the temperature range between room temperature and 300° C. was less than $5 \cdot 10^{-6}$/K. The transformation temperature Tg was above 600° C. The light transmission of the glasses, which is important in particular for quality assessment, was over 85% for a thickness of 4 mm.

For use as mirror substrate material in vitreous form, the glasses have a high IR transmission at 1050 nm and a thickness of 4 mm of >85%. These good transmission values were also achieved in the wavelength range from 900 to 1600 nm.

The DTA peak temperatures for the crystallization of the beta-quartz solid solution and the transition to the keatite solid solution were at least 40° C. apart.

On account of their compositions, Comparative Examples 8 and 9 have a very low viscosity. The transformation temperatures Tg are low. In Comparative Example 8, the devitrification stability does not satisfy the requirements.

Table 2 lists the starting glasses for the ceramicization corresponding to the glass No. from Table 1. Examples 17 and 18 are comparative glass-ceramics.

The ceramicization, i.e. the conversion of the glasses into the glass-ceramics, took place under the nucleation and crystallization conditions listed in Table 2. The glasses were heated from room temperature to 500° C. at 5 K/min. Heating to the nucleation temperatures listed took place at 4 K/min. Nucleation temperatures and the duration of nucleation are given in Table 2. The increase from the nucleation temperature to the crystallization temperature was carried out at a heating rate of 1.5 K/min. At the crystallization temperature given and over the duration listed, the glasses were crystallized. The cooling took place at up to 500° C., with a cooling rate of approx. 4 K/min, then by switching off the furnace heating.

Examples 12 and 15 show glass-ceramics which have been converted into white/translucent glass-ceramics with keatite solid solutions as the main crystal phase. The remaining examples according to the invention have beta-quartz solid solutions as the predominant crystal phase.

TABLE 1

Compositions and properties of glasses

| Example No. | 1 | 2 | 3 | 4 | 5 | 6 | 7 | 8 | 9 |
|---|---|---|---|---|---|---|---|---|---|
| Glass No. | 1 | 2 | 3 | 4 | 5 | 6 | 7 | 8 | 9 |
| $Li_2O$ (% by weight) | 4.60 | 4.56 | 4.55 | 4.30 | 4.75 | 4.00 | 3.70 | 5.00 | 3.93 |
| $Na_2O$ (% by weight) | 0.60 | 0.60 | 0.60 | 0.90 | 0.60 | 0.20 | 0.50 | | 0.80 |
| $K_2O$ (% by weight) | 0.40 | 0.40 | 0.40 | | 0.38 | 0.80 | | 0.70 | 0.55 |
| MgO (% by weight) | 0.25 | 0.25 | | | 0.10 | 0.10 | 0.45 | 1.80 | 1.80 |
| CaO (% by weight) | | | | | | | | 0.10 | |
| SrO (% by weight) | 0.75 | | | 1.00 | | 0.30 | | | |
| BaO (% by weight) | | 1.11 | 1.10 | | 1.16 | 1.50 | 2.00 | | |
| ZnO (% by weight) | | | | 0.20 | | 0.10 | 1.70 | 0.95 | 0.97 |
| $B_2O_3$ (% by weight) | 2.00 | 2.0 | 2.00 | 1.00 | 2.10 | | | 2.80 | 2.70 |
| $Al_2O_3$ (% by weight) | 23.00 | 22.90 | 22.95 | 23.20 | 19.70 | 24.5 | 21.80 | 23.00 | 22.50 |
| $SiO_2$ (% by weight) | 60.50 | 60.28 | 60.35 | 59.80 | 62.85 | 58.0 | 64.30 | 57.95 | 59.20 |
| $TiO_2$ (% by weight) | 2.50 | 2.50 | 2.55 | 3.20 | 2.66 | 3.80 | 2.40 | 2.50 | 3.40 |
| $ZrO_2$ (% by weight) | 1.60 | 1.60 | 1.55 | 1.10 | 1.63 | 1.00 | 1.70 | 1.65 | 0.98 |
| $P_2O_6$ (% by weight) | 2.20 | 2.20 | 2.35 | 4.00 | 2.40 | 4.00 | | 1.75 | 1.89 |
| $As_2O_3$ (% by weight) | | | | 1.30 | | | | 0.80 | 0.28 |
| $Sb_2O_3$ (% by weight) | 1.60 | 1.60 | 1.60 | | 1.67 | 1.50 | 1.45 | | |
| F (% by weight) | | | | | | 0.20 | | 1.00 | 1.00 |
| $Fe_2O_3$ (ppm) | 58 | 87 | 84 | 64 | 73 | 140 | 470 | 81 | 110 |
| $H_2O$ (mol/l) | 0.035 | 0.040 | 0.039 | 0.030 | 0.036 | 0.031 | 0.028 | 0.026 | 0.039 |
| Glass properties: | | | | | | | | | |
| Tg (° C.) | 643 | 644 | 650 | 655 | 625 | 661 | 680 | 580 | 601 |
| $V_A$ (° C.) | 1245 | 1245 | 1257 | 1278 | 1269 | 1273 | 1288 | 1163 | 1203 |
| $\alpha_{20/300}$ ($10^{-6}$/K) | 4.8 | 4.7 | 4.7 | 4.5 | 4.9 | 4.3 | 4.1 | 4.9 | 4.5 |
| Density (g/cm$^3$) | 2.435 | 2.443 | 2.436 | 2.420 | 2.421 | 2.460 | 2.496 | 2.443 | 2.434 |
| Light transmission, thickness 4 mm, $\tau$ (%) | 91.3 | 91.4 | 91.1 | 91.1 | 90.9 | 90.6 | 89.4 | 90.9 | 89.7 |
| IR transmission | | | | | | | | | |
| 1050 nm (%) | 91.6 | 91.6 | 91.4 | 91.2 | 91.5 | 90.5 | 87.1 | 91.7 | 91.5 |
| 1800 nm (%) | 91.6 | 91.5 | 91.3 | 91.3 | 91.4 | 90.7 | 88.4 | 91.9 | 91.5 |
| Devitrification behaviour: | | | | | | | | | |
| UDL (° C.) | 1250 | 1255 | 1230 | 1215 | 1260 | 1315 | 1325 | 1230 | 1130 |
| Crystal phase | Baddeleyite | Baddeleyite | Baddeleyite | Mullite | Baddeleyite | Mullite | Mullite | Baddeleyite | Keatite |
| Crystallization behaviour: DTA peak temperatures: | | | | | | | | | |
| beta-quartz SS (° C.) | 812 | 815 | 825 | 850 | 824 | 837 | 829 | 751 | 765 |
| kealite SS (° C.) | 912 | 917 | 926 | 981 | 865 | 1013 | 1013 | 797 | 847 |

The crystal phase fractions and the mean crystallite size of the main crystal phase were determined by means of X-ray diffractometry.

The examples according to the invention have the desired low values for the thermal expansion measured in the temperature range between 20° C. and 300° C.

produced from a casting with a fire-polished surface, as is formed during the casting of the glass. One of the specimens remains vitreous for comparison purposes, while others are converted into the glass-ceramic under the ceramicization conditions listed. The surface roughness Ra of the specimens is measured using an atomic force microscope (AFM) in a

TABLE 2

Ceramicization conditions and properties of glass-ceramics according to the invention and comparative glass-ceramics (Examples 17, 18)

| Example No. | 10 | 11 | 12 | 13 | 14 | 15 | 16 | 17 | 18 |
|---|---|---|---|---|---|---|---|---|---|
| Glass No. | 1 | 2 | 2 | 3 | 4 | 5 | 6 | 7 | 9 |
| Ceramicization conditions: | | | | | | | | | |
| Nucleation | 700° C., 1 h | 700° C., 1 h | 700° C., 1 h | 700° C., 1 h | 685° C., 3 h | 680° C., 1 h | 630° C., 1 h | 740° C., 1 h | 665° C., 1 h |
| cystallization | 780° C., 1 h | 780° C., 1 h | — | 785° C., 1 h | 820° C., 1 h | — | 830° C., 1 h | 850° C., 1 h | 725° C., 1 h |
| Conversion | — | — | 825° C., 1 h | — | — | 780° C., 1 h | — | — | — |
| Main crystal phase | β-QSS | β-QSS | keatite SS | β-QSS | β-QSS | keatite SS | β-QSS | β-QSS | β-QSS |
| Phase proportion | | | | | | | | | |
| beta-quartz SS (%) | 75 | 71 | — | 72 | 74 | 25 | 70 | 72 | 68 |
| keatite SS (%) | — | — | 93 | — | — | 75 | — | — | 1 |
| mean crystallite size (nm) | 42 | 43 | 120 | 39 | 36 | 100 | 38 | 37 | 55 |
| Properties, ceramicized: | | | | | | | | | |
| Transparency | transparent | transparent | white-translucent | transparent | transparent | white-translucent | transparent | transparent | white-translucent |
| Thermal expansion 20–300° C. ($10^{-6}$/K) | −0.4 | −0.4 | +1.0 | −0.6 | −0.1 | +0.6 | −0.2 | −0.4 | +0.5 |
| IR transmission, 4 mm thickness | | | | | | | | | |
| 1050 nm (%) | 90.2 | 91.0 | 87.5 | 89.8 | 90.7 | 85.3 | 88.6 | 84.8 | 91.1 |
| 1800 nm (%) | 90.8 | 91.3 | 90.3 | 90.1 | 90.4 | 90.4 | 88.7 | 83.2 | 91.6 |
| Surface roughness Ra (nm) | | | | | | | | | |
| Starting glass: | 0.45 | 0.30 | 0.30 | 0.37 | 0.25 | 0.60 | 0.19 | 0.41 | Surface spalling |
| Glass-ceramic: | 0.43 | 0.40 | 0.61 | 0.42 | 0.27 | 0.40 | 0.49 | 0.46 | |
| Light transmission, 4 nm thickness, τ (%) | 87.9 | 87 | 53 | 86.5 | 88.6 | 54.2 | 83.7 | 68.0 | 82.6 |
| Compaction after 600° C., 200 h (μm/100 mm) | 51 | 53 | 16 | 49 | 18 | n.d. | 13 | 6 | 164 |

Abbreviations:
β-QSS: beta-quartz solid solutions
n.d. not determined

The drawing comprises FIG. 1 and FIG. 2. FIG. 1 shows the transmission curve of glass-ceramics as a function of the wavelength.

FIG. 1 shows the transmission curve for glass No. 2, and the glass-ceramics produced therefrom comprising beta-quartz or keatite solid solutions as the main crystal phase (Examples 11 and 12). High transmission values are reached between 900 and 1800 nm. By contrast, the comparative glass-ceramic Example No. 17, in the ceramicized state, has broad absorption bands at approx. 1050 nm and 1800 nm, which are attributable to the high iron contents. The examples according to the invention achieve the required high IR transmission. The light transmission of the glass-ceramics according to the invention has the high values which are important for quality inspection.

FIG. 2 shows Li, Na, K and BaSIMS depth profiles of the glass-ceramic according to the invention.

To measure the surface roughness of the glass-ceramic, a plurality of specimens of approximately the same size, with a surface of 2×2 cm² and a thickness of approx. 0.5 cm, are square measurement region with a side length of 50 μm. A fire-polished surface is used for the measurement in the manner described, since this means that the surface is not influenced by the process conditions employed during pressing. The low roughness values are attributable to the presence of a vitreous surface layer in the glass-ceramics. In the comparative glass-ceramic Example 18, it was impossible to measure the surface roughness, since spalling occurred on the surface layer.

FIG. 2 shows the depth profile for the elemental concentrations of Li, Na, K and Ba measured on a transverse section from Example 13. It can be seen from the concentration profile of the alkali metal and alkaline-earth metal elements that in this example the vitreous surface layer with a thickness of approximately 400 nm, which is favourable with a view to achieving good surface roughness values, has been formed. The Li depth profile correlates to the presence of the crystals in which it is preferably incorporated.

The compaction is measured as the change in length of a 100 mm long bar during conditioning at 600° C., 200 h. At this temperature, which is higher than customary use conditions, the temperature/time load-bearing capacity of the glass-ceramic is recreated in an accelerated-time test. The required low compaction values are achieved, while the comparative glass-ceramic Example, 18 has high values.

What is claimed is:

1. A glass-ceramic comprising at least one of beta-quartz and keatite solid solutions having a surface roughness without polishing of Ra <50 nm, a thermal expansion in the temperature range between 20° C. and 300° C. of <1.2 •$10^{-6}$/K, a transmission in the near infrared region at 1050 nm of >85% for a thickness of 4 mm, and a composition in % by weight, based on the total composition, as follows:

| | |
|---|---|
| $Li_2O$ | 3.0–5.5 |
| $Na_2O$ | 0–2.5 |
| $K_2O$ | 0–2.0 |
| Σ $Na_2O$ + $K_2O$ | 0.5–3.0 |
| Σ MgO + ZnO | <0.3 |
| SrO | 0–2.0 |
| BaO | 0–3.5 |
| $B_2O_3$ | 0–4.0 |
| $Al_2O_3$ | 19.0–27.0 |
| $SiO_2$ | 55.0–66.0 |
| $TiO_2$ | 1.0–5.5 |
| $ZrO_2$ | 0–2.5 |
| Σ $TiO_2$ + $ZrO_2$ | 3.0–6.0 |
| $P_2O_5$ | 0–8.0 |
| $Fe_2O_3$ | <200 ppm |
| F | 0–0.6 | and optionally at least one refining agent selected from the group consisting of $As_2O_3$, $Sb_2O_3$, $SnO_2$, $CeO_2$, sulphate compounds and chloride compounds, and a vitreous layer on the surface.

2. A glass-ceramic according, to claim 1, wherein beta-quartz solid solutions are the main crystal phase, the glass ceramic having a thermal expansion in the temperature range between 20° C. and 300° C. of <0.5 •$10^{-6}$K, a transmission in the near infrared region at 1050 nm of >87%, for thickness of 4 mm, and a composition in % by weight, based on the total composition, as follows:

| | |
|---|---|
| $Li_2O$ | 3.0–5.5 |
| $Na_2O$ | 0–2.0 |
| $K_2O$ | 0–1.5 |
| Σ $Na_2O$ + $K_2O$ | 0.5–2.5 |
| Σ SrO + BaO | <4.0 |
| Σ $TiO_2$ + $ZrO_2$ | 3.5–5.5 |
| Σ $B_2O_3$ + $P_2O_5$ | 1.0–8.0 |
| $Fe_2O_3$ | <130 ppm |
| F | 0–0.3 | and, optionally, at least one refining agent.

3. A glass-ceramic according to claim 1, having a composition in % by weight, based on the total composition, as follows:

| | |
|---|---|
| $Li_2O$ | 3.0–5.0 |
| $Na_2O$ | 0–2.0 |
| $K_2O$ | 0–1.5 |
| Σ $Na_2O$ + $K_2O$ | 0.5–2.0 |
| Σ SrO + BaO | <3.0 |
| $B_2O_3$ | 0–3.0 |
| $Al_2O_3$ | 21.0–27.0 |
| $TiO_2$ | 1.5–5.5 |
| Σ $TiO_2$ + $ZrO_2$ | 3.5–5.0 |
| Σ $B_2O_3$ + $P_2O_5$ | 1.0–8.0 | and optionally at least one refining agent.

4. A glass-ceramic according to claim 1, having a composition in % by weight, based on the total composition, as follows:

| | |
|---|---|
| $Li_2O$ | 3.5–5.0 |
| $Na_2O$ | 0–2.0 |
| $K_2O$ | 0–1.5 |
| Σ $Na_2O$ + $K_2O$ | 0.5–2.5 |
| Σ SrO + BaO | 1.0–4.0 |
| $Al_2O_3$ | 20–25 |
| $SiO_2$ | 55–63 |
| $TiO_2$ | 1.5–5.5 |
| $ZrO_2$ | 0–2.0 |
| Σ $TiO_2$ + $ZrO_2$ | 3.5–5.0 |
| $P_2O_5$ | 1.0–8.0 |
| Σ $B_2O_3$ + $P_2O_5$ | 2.0–8.0 | and, optionally, at least one refining agent.

5. A glass-ceramic according claim 1 in which the mean crystallite (size is <300 nm.

6. A glass-ceramic according claim 1 wherein said vitreous layer on the surface is up to 1.5 μm thick, and the increase in the surface roughness of the glass-ceramic during ceramicization is less than 10 nm.

7. A glass-ceramic according claim 1 additionally containing at least one colored oxide which absorbs in the visible region but does not absorb or absorbs only to a slight extent in the near infrared region.

8. A glass-ceramic as claimed claim 1 which has a high temperature/time load-bearing capacity with regard to compaction of <60 μm/100 mm after conditioning at 600° C., 200 h.

9. A glass-ceramic according to claim 1 which has a high IR transmission of >85%, for a thickness of 4 mm, in the wavelength range between 900 nm –1800 nm.

10. A glass-ceramic according to claim 1 in which the light transmission of the glass-ceramic is >50%, for a thickness of 4 mm.

11. The glass-ceramic of claim 1 wherein the vitreous layer comprises Na2O.

12. The glass-ceramic according to claim 11, which has a thermal expansion in the temperature range between 20° C. and 300° C. of <5 •$10^{-6}$/K, and a transformation temperature Tg of >600° C.

13. The glass-ceramic according to claim 11 which has an IR transmission of >85%, for a thickness of 4 mm, in the wavelength range between 900 nm –1800 nm.

14. The glass-ceramic according to claim 11 which has a light transmission of >85% for a thickness of 4 mm.

15. A reflector having an inner contour which approaches one or more parabolas, comprising the glass-ceramic of claim 11.

16. A reflector according to claim 15, which has an IR-transmitting mirror coating.

17. An article of manufacture comprising a substrate comprising the glass-ceramic according to claim 1 and a coating.

18. The article of manufacture of claim 17, wherein the article is a cold-light reflector.

19. The glass ceramic of claim 1, wherein said vitreous layer comprises at least one alkaline metal oxide or alkaline earth metal oxide.

20. The glass ceramic of claim 1, wherein said vitreous layer comprises a metal oxide selected from the group consisting of Na2O, K2O, Rb2O, Cs2O, SrO and BaO.

* * * * *